United States Patent

Cripe

[15] 3,646,758
[45] Mar. 7, 1972

[54] VACUUM CONTROL FOR SERVOMOTOR

[72] Inventor: Maxwell L. Cripe, South Bend, Ind.

[73] Assignee: The Bendix Corporation

[22] Filed: Mar. 30, 1970

[21] Appl. No.: 23,638

[52] U.S. Cl. ........................................60/54.6 P, 60/54.5 P
[51] Int. Cl. ..............................................F15b 7/00
[58] Field of Search ........................60/54.5 P; 92/99

[56] References Cited

UNITED STATES PATENTS

| | | | |
|---|---|---|---|
| 3,146,682 | 9/1964 | Price et al. | 92/99 |
| 3,292,502 | 12/1966 | Myers et al. | 92/48 |
| 3,108,615 | 10/1963 | Cripe | 137/625.66 |
| 3,114,241 | 12/1963 | Hager | 60/54.5 P |
| 2,593,394 | 4/1952 | Rockwell | 60/54.5 P |
| 3,201,176 | 8/1965 | Hager | 60/54.5 P |

FOREIGN PATENTS OR APPLICATIONS

| | | | |
|---|---|---|---|
| 573,144 | 3/1959 | Canada | 60/54.5 P |

*Primary Examiner*—Edgar W. Geoghegan
*Attorney*—William N. Antonis and Plante, Arens, Hartz, Smith and Thompson

[57] ABSTRACT

A control for a power brake system having a servomotor as the source of power. The servomotor has a housing with a diaphragm dividing it into front and rear chambers. Vacuum from the intake manifold of a vehicle is supplied to the front and rear chambers to suspend a power piston attached to the diaphragm member. A valve member secured to the rear chamber and responsive to movement of the brake pedal closes the vacuum communication in the rear chamber creating a pressure differential across the diaphragm member. This pressure differential causes the diaphragm member to move the power piston of the servomotor. A relay valve is placed in the vacuum line supplying the front and rear chambers. When the vacuum in the servomotor is below a predetermined value, the communication to the front chamber is sealed thereby assuring a pressure differential across the diaphragm upon brake application. A check valve is placed between the intake manifold and the relay valve which allows flow of air from the chambers but prevents backflow when the intake manifold vacuum is low. A vacuum reservoir has been provided to help maintain the vacuum level in the system when the manifold vacuum is low. In this brake system a number of brake applications are assured with power assist when the motor of the vehicle is not running.

2 Claims, 5 Drawing Figures

INVENTOR
MAXWELL L. CRIPE
BY
Planté, Arens, Hartz,
Smith & Thompson
ATTORNEYS

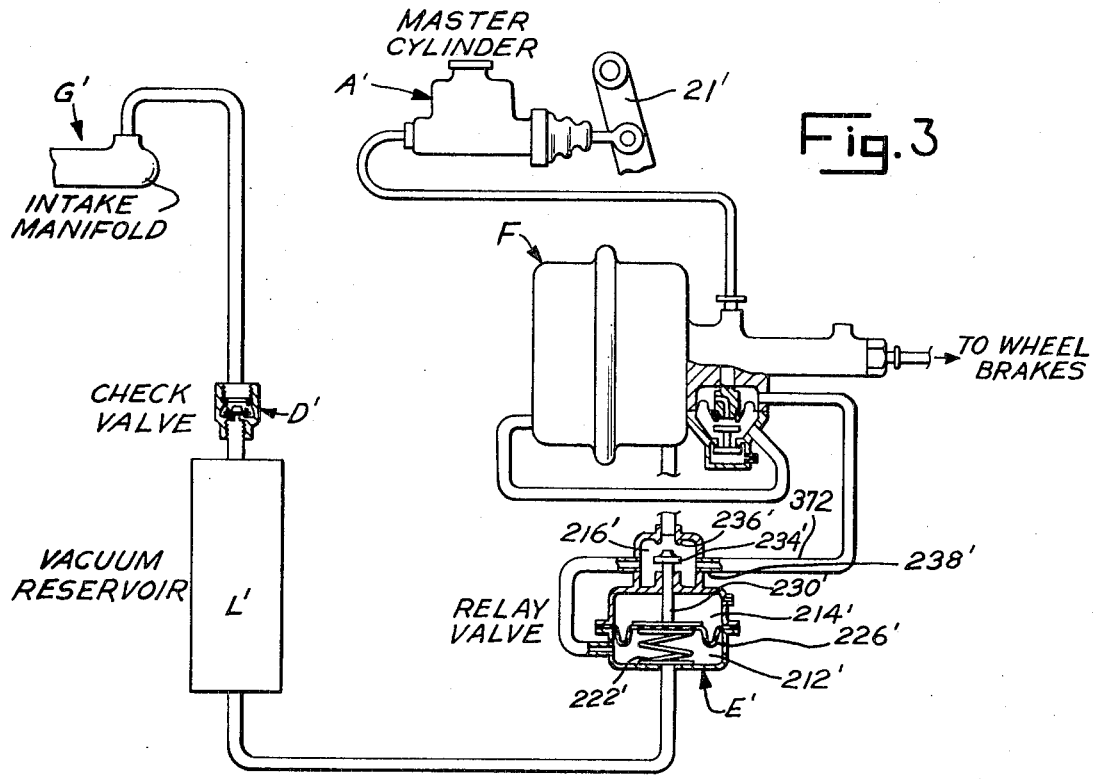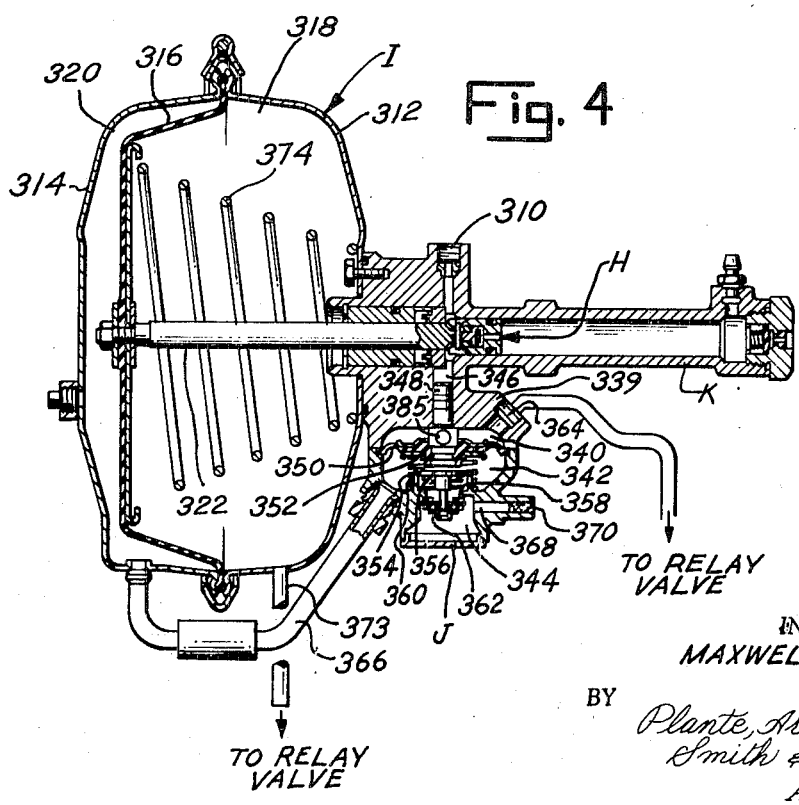

3,646,758

VACUUM CONTROL FOR SERVOMOTOR

BACKGROUND OF THE INVENTION

This invention relates to an improved servomotor used to operate power brakes. More particularly, the invention relates to a positive control for a power brake system.

In general, the type of fluid-operated servomotor that we are concerned with comprises a flexible diaphragm sandwiched between two shells forming a housing containing variable chambers. A vacuum is produced in one chamber and atmospheric pressure in the other to drive a piston to increase the fluid pressure force going to the wheel brakes. This type of servomotor is shown in U.S. Pat. Nos. 3,114,241 (Hager), 3,292,502 (Myers), and 3,146,682 (Price).

In many power brake systems now in production, using the type of servomotor shown above, if the engine of the vehicle stops, the manifold vacuum is eliminated. Thereafter, if the driver lightly strokes the brake pedal several times, he has lost his power brakes and must resort to mechanical means to stop the vehicle. In the event the vehicle is travelling on a steep mountain road, the force required to bring the vehicle to a stop would be very great.

SUMMARY OF THE INVENTION

An object of the invention is to provide a power brake system which is not without power even though the engine of the vehicle is not running.

A further object of the present invention is to provide means whereby the front chamber of the servomotor is sealed when the vacuum in the servomotor is below a predetermined value to assure a pressure differential across a power piston upon brake application.

A still further object of the invention is to provide means, upon loss of engine vacuum, for applying and releasing the brakes a number of times with power assist.

The invention resides in certain constructions, combinations and arrangements of parts; and further objects and advantages of the invention will become apparent to those skilled in the art to which the invention relates from the following description of the preferred embodiments described with reference to the accompanying drawings forming a part of this specification, and in which:

FIG. 3 is a schematic brake system using a hydraulic fluid pressure servomotor in accordance with the principles of my invention;

FIG. 4 is a cross-sectional view of the servomotor means of FIG. 3; and

DESCRIPTION OF THE PREFERRED EMBODIMENTS

Figure 1:
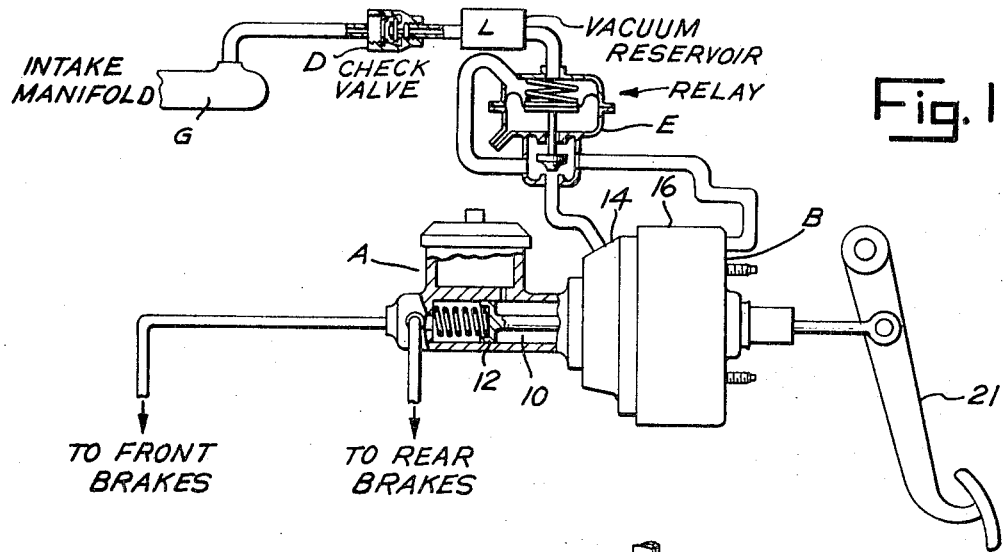
FIG. 1 is a schematic brake system in accordance with the principles of my invention.
Figure 2:
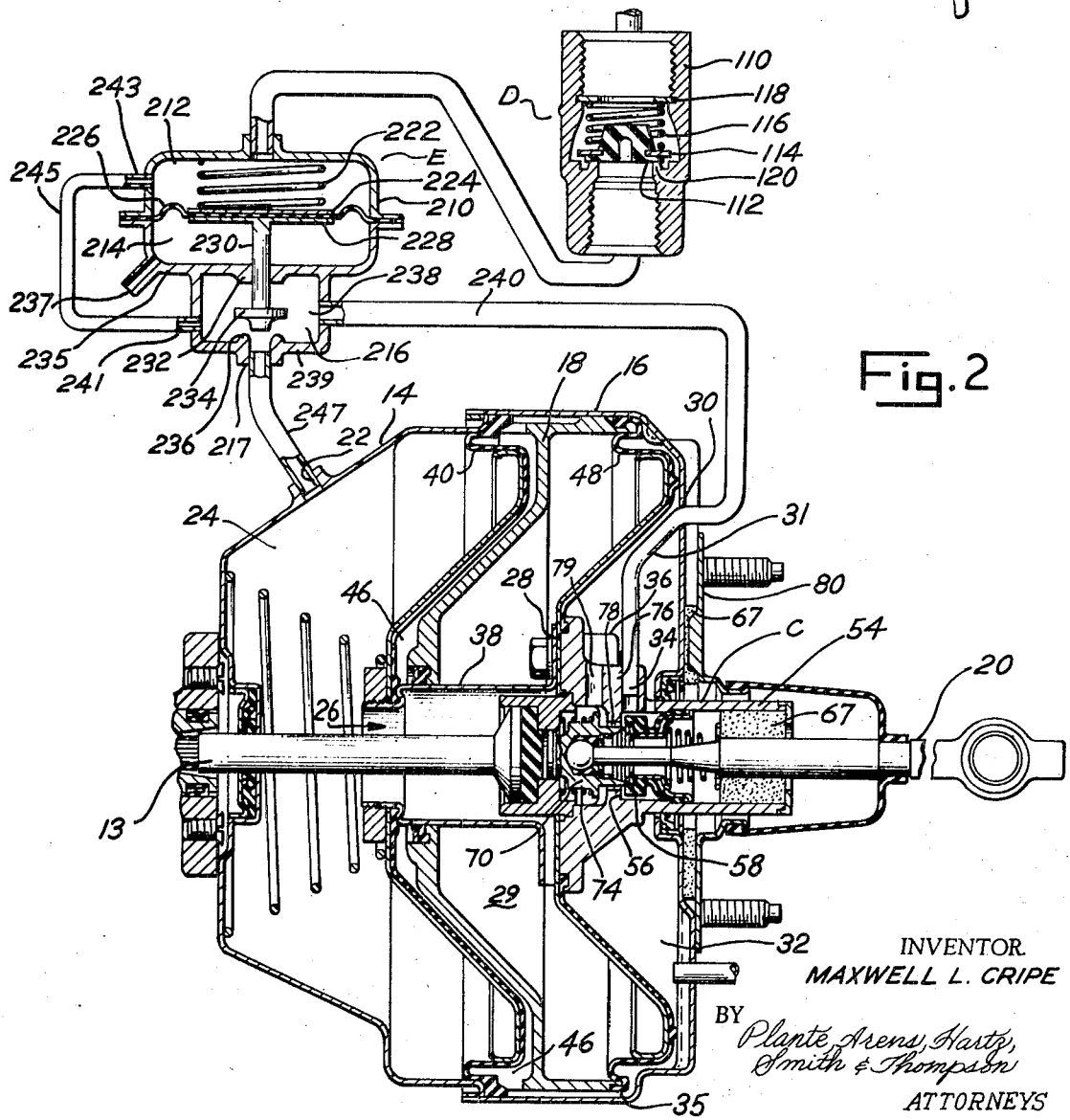
FIG. 2 is a cross-sectional view of the servomotor means of FIG. 1.

The vehicle braking system shown in FIG. 1 of the drawings generally comprises a conventional master cylinder A having a fluid pressurizing chamber 10 therein from which hydraulic fluid is forced by the piston 12 to the individual wheel brake assemblies. A fluid pressure servomotor B, which is made up of a tandem piston that is vacuum submerged in a shell formed by means of a front cover 14 and a rear cover 16 containing internal partition 18, as shown in FIG. 2, power drives piston 12 of the master cylinder A by rod member 13. The valve structure C, shown in FIG. 2, for the servomotor is mounted on and carried by a movable wall structure 28 so that movement of the valve-operating rod 20 in response to the application of the brake pedal 21 causes the movable wall structure 28 to move correspondingly. The movable wall structure is made up of a hub member 36 which is connected to a tubular projection 38 extending through the partition 18. A flexible rear diaphragm 48 is sealably attached between the hub 36 and tubular projection 38 and a flexible front diaphragm 40 is sealably attached to the end of the tubular projection extending through the partition 18. The outer edges of the diaphragms are suitably fixed to the shell of the servomotor. The front diaphragm divides the space in front of the partition 18 into front 24 and rear 46 power chambers and the rear diaphragm divides the space to the rear of the partition 18 into front 29 and rear 32 power chambers, respectively.

The engine intake manifold G is the vacuum power source for operating the brake system with reservoir L in the system as a reserve source of vacuum to maintain the line pressure when the manifold vacuum is low or when the engine of the vehicle stops. Vacuum for operating the servomotor B is communicated through port 22 of the front shell 14 to the first front chamber 24, from where it flows by way of central opening 26 into a second front chamber 29 and through port 30 of the rear shell, through a flexible hose 31 to passageway 34 of the control valve C from where it flows to chambers 32 and 46 to suspend the diaphragms 40 and 48 in their rest position. A check valve D is located in the conduit coming from the engine intake manifold G connected to the reservoir L. The check valve D allows air to be evacuated from chambers 24, 29, 32 & 46 when the intake manifold vacuum is high while preventing backflow when the vacuum is low. A relay valve E is located between the chambers and the check valve which closes the communication of vacuum from the system to the front chamber when vacuum in the servomotor is below a predetermined level.

The control valve structure C as shown in Fig. 2, has a piston guide tube 54 extending through and suitably sealed with the rear shell. The hub 36 has an internal partition 76 with an axially extending opening therethrough forming the control port 78 of the valve. The control port 78 is surrounded by a rearwardly facing vacuum valve seat 56. An annular valve closure 58 positioned to be retained on the valve seat 56 carries a radially outwardly extending diaphragm suitably sealed to the guide tube. A mounting plate 80 attached to the rear shell surrounds the guide tube in a manner to allow air to pass into the guide tube through filter 67. Thus, it is seen that there is atmospheric pressure available to the annular valve 58 at all times. Atmospheric pressure being controlled by a poppet member 70 with a rearward projection, for seating with closure member 58, is positioned in front of the partition 76. Normally, the poppet member 70 is biased by a valve return spring 74 strong enough to unseat the valve closure member 58 from the vacuum valve seat 56. In the rest position, as shown in FIG. 2 with the vehicle engine running, vacuum is free to flow through passageway 34, around the vacuum valve seat 56 to control port 78 and into the rear chamber 32, thence to a second rear chamber 46 by way of vacuum passage chamber 35.

The check valve D consists of a valve body 110 containing a poppet seal 112 and seal retainer 114, a poppet spring 116 and a poppet retainer 118. The spring 116 that holds the seal 112 against the seat 120 is of such strength as not to impede the flow of air from ports 22 and 30 of the servomotor to the intake manifold. When the vacuum at the intake manifold is greater than the vacuum in the chambers of the servomotor, the pressure differential causes the seal 112 to lift off seat 120. When the vacuum at the intake manifold is less than in the chambers of the servomotor, the pressure differential holds the poppet seal on the seat preventing the flow of air into the servomotor. Thus, the check valve allows air to be removed from the chambers when the manifold vacuum is high, but maintains the vacuum in the chambers during periods of low vacuum at the intake manifold.

The relay valve E consists of a valve body 210 containing a valve spring 222 retained by a diaphragm backing plate 224, a diaphragm 226, a front diaphragm plate 228 attached to a valve-actuating rod 230 retained and sealed in bearing member 232, and a poppet seal member 234. Diaphragm 226 is sealably secured to the valve body 210 to form valve chamber 212 which is connected to check valve D controlling the flow of vacuum from the intake manifold G. Diaphragm 226 and wall 235 containing bearing member 232 form chamber 214 which is opened to the atmosphere through port 237. Chamber 216 formed by walls 235 and 239 is connected to chamber 212 by conduit 245 going from port 241 to port 243. Port 238 in the wall of chamber 216 is connected by conduit 240 to port 30 of the rear shell 16 while conduit 247 connects port 217 to port 22 of the front shell 14. When the manifold vacuum is high, the pressure differential between chambers 212 and 214 overcomes the force of valve spring 222 and lifts the poppet member 234 off valve seat 236 to allow air to pass from chambers 24 and 29 of the servomotor while chambers 32 and 46 are evacuated by allowing air to flow from passageway 34 through chambers 212 and 216 to the intake manifold. When the vacuum pressure in the servomotor is low, the pressure differential between chambers 212 and 214 is not enough to unseat the poppet 234. With poppet 234 retained on valve seat 236, we have sealed vacuum in chambers 24 and 29 to assure a pressure differential in the servomotor upon application of the brake pedal opening chambers 32 and 46 to air pressure.

In normal operation of the power brake system shown by FIG. 1 upon depressing the brake pedal 21, the valve-operating rod 20 moves forward into the servomotor. Correspondingly, poppet member 58 engages the vacuum valve seat 56, closing passage 34 while moving valve seat 70 out of engagement with closure member 58 allowing atmospheric pressure to pass into rear chambers 32 and 46. When the engine is running and producing high vacuum at the intake manifold, a pressure differential occurs across the diaphragm 226 of the relay valve E. When the pressure differential across diaphragm 226 overcomes spring 222 poppet member 234 will move away from seat 236 allowing vacuum to chambers 24 and 29. With vacuum in chambers 24 and 29 and atmospheric pressure in chambers 32 and 46 a pressure differential occurs across the diaphragm members 40 and 48. This pressure differential causes the diaphragm members 40 and 48 to move. The movement of the diaphragm members 40 and 48 is transmitted from the attached hub 36 to rod member 13 for energizing power piston 12 of the master cylinder to stop the vehicle with power assist. If the engine of the vehicle stops or the intake manifold vacuum is low, the reservoir L will provide vacuum to permit the brakes to be applied several times with power assist. When the level of the vacuum in the servomotor system drops, due to dumping of atmospheric pressure from the rear chambers 32 and 46 through passage 34 upon release of the brake pedal, below a predetermine level the pressure differential across diaphragm 226 will not be great enough to overcome the seating force of spring 222. Poppet 234 being attached to spring 222 is forced on seat 236, sealing the existing vacuum in chambers 24 and 29. With the vacuum sealed in the front chambers 24 and 29, one full power assist is available and additional brake applications with reduced assist can occur until the dumping of the atmospheric pressure from rear chambers 32 and 46 reduce the vacuum in the servomotor (excluding sealed chambers 24 and 29) to atmospheric pressure. Thus, a brake system is provided which will insure power assist at all times.

Figure 5:
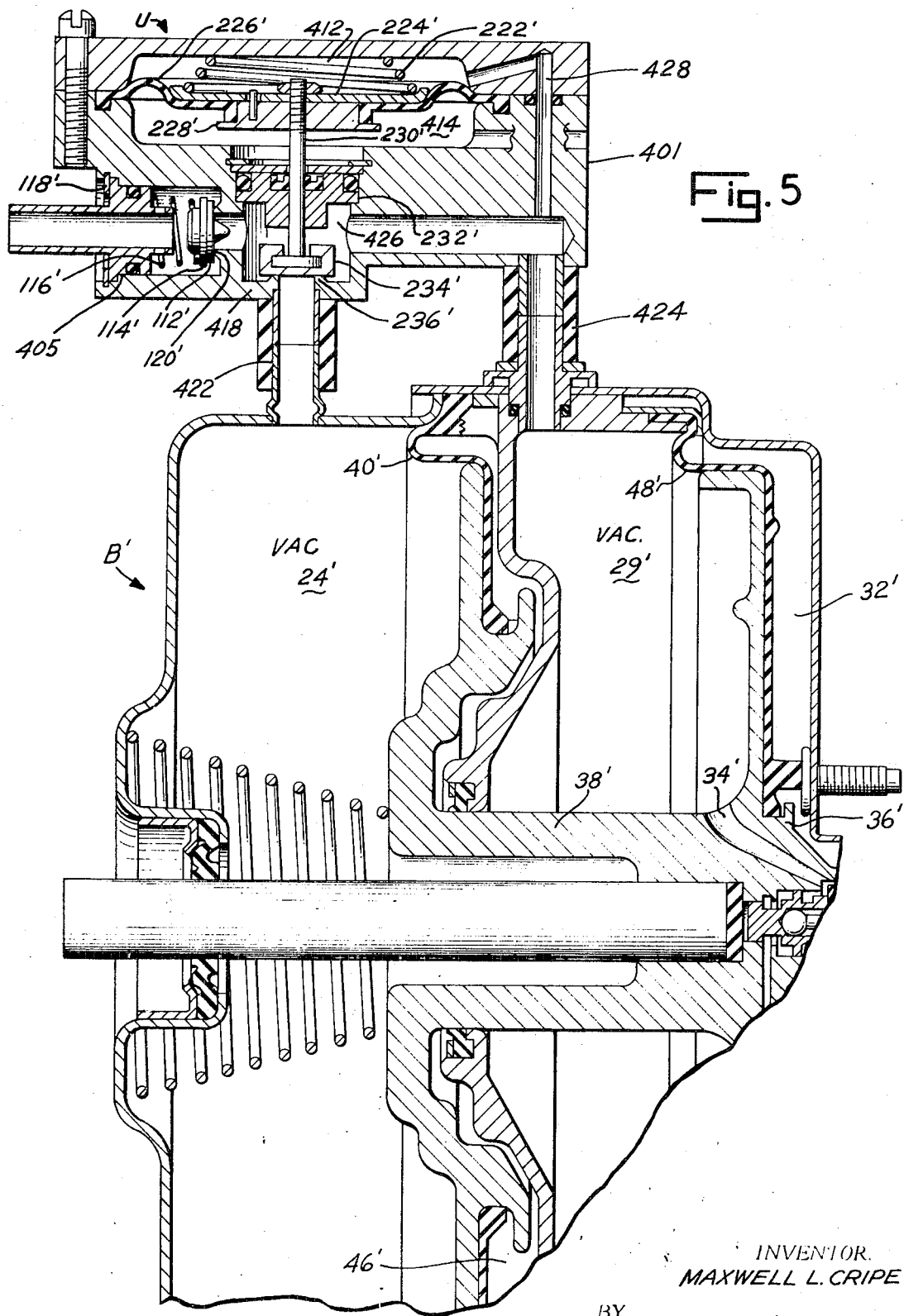
FIG. 5 is a cross-sectional view of a combined relay and check valve control for use in a system, as shown in FIG. 1.

In the embodiment shown in FIGS. 3, 4 and 5, like numbers plus a prime designate similar elements described in detail in reference to FIGS. 1 and 2.

In the embodiment shown in FIGS. 3 and 4, a hydraulic fluid pressure servomotor is the means which aids in applying the brake system of a vehicle. The hydraulic pressurizing device F, of a type described in U.S. Pat. No. 3,108,615 (Cripe), has a fluid displacing piston H which is actuated by means of diaphragm 316 within the fluid pressure motor I. Fluid pressure from a master cylinder A' is transmitted to the rear of the displacing piston H through port 310 and into valve control J which regulates the vacuum pressure supplied to the rear chamber 320 of fluid pressure motor I. The fluid pressure motor I unit is made up of a front 312 and rear 314 shell wherein a diaphragm 316 divides the unit into front 318 and rear 320 chambers. Vacuum from the intake manifold G' is supplied to the front and rear chamber at all times with equal intensity when the master cylinder is deenergized and the vehicle is running to vacuum suspend the diaphragm member 316. The movable diaphragm 316 of the fluid pressure motor I is activated by the flow of atmospheric pressure through control valve J into the rear chamber 320. When a pressure differential is created between the front 318 and rear 320 chambers, the push rod 322 moves to displace the piston H in the slave cylinder K. This fluid pressure motor I supplies power assist in the force applied to the wheel brakes to stop the vehicle.

As seen in FIG. 4, the control valve J consists of a housing 339 having three chambers; a vacuum chamber 340, a control chamber 342 and an atmospheric chamber 344.

The housing 339 has a central bore 346 connected to the rear of the fluid displacing piston H. A control valve piston 348 sealed in the bore extends through vacuum chamber 340 into the control chamber 342. A diaphragm 350 which separates the vacuum 340 and control chambers 342 is attached to the valve piston by means of retainers 352. A poppet member 356 controls the flow of air between chambers 342 and 344. A diaphragm return spring 354 is placed on the outside of the poppet member 356, to retain the diaphragm 350 in its proper location during the control operation. A poppet return spring 358 is first placed in the guide 360 and then the poppet 356 with the stem extending into the atmospheric chamber 344. A poppet seal 362 is attached to the end of the stem so that when vacuum is supplied to chambers 340 and 342, the poppet member 356 will be retained by spring 358 to seal the chamber from the atmospheric pressure in chamber 344. The atmospheric chamber 344 contains port 368 and filter means 370 to purify the air going to the control valve J.

Normally, vacuum is supplied to chamber 340 through port 364 into control chamber 342, by passage 385, from where by means of conduit 366 it is communicated to the rear chamber 320 of the servomotor I. Conduit means 372 connects port 364 with port 238' of the relay valve E' which controls the vacuum supplied to the front chamber 322 through conduit 373. The structure of the relay valve E', vacuum reservoir L', check valve D' and intake manifold is the same as that described in the embodiment of FIG. 1.

In normal operation with the vehicle running and manifold vacuum high, when the brake pedal 21' is pushed, the master cylinder A' supplied a fluid pressure to move the control valve piston 348. The control valve piston 348 engages the poppet member 356 opening chamber 342, to atmospheric pressure through chamber 344, and closing the vacuum passage 364. Atmospheric pressure travels through the chamber 344 and via conduit 366 to the rear chamber 320 of the servomotor I. The front chamber 312 being controlled by the relay valve E' always retains a vacuum, as disclosed in reference to FIG. 1. Since the control valve has allowed atmospheric pressure to reach the rear chamber, a pressure differential is created between the front chamber 318 and rear chamber 320 of the servomotor. This pressure differential across the diaphragm creates a force which the push rod 322 transmits to move the slave piston to aid in stopping the vehicle.

Similarly, as in the operation of the brake system of FIG. 1, if the engine of the vehicle stops or the vacuum produced by intake manifold G is below a predetermined level, the vacuum reservoir L will maintain the line pressure at its proper operating level permitting several brake applications. When dumping of atmospheric pressure has reduced the vacuum in the servomotor I to a predetermined level, the pressure differential across diaphragm 226' of the relay valve E cannot overcome spring 222'. Since the pressure differential across diaphragm 226' is less than the force of spring 222', poppet 234' is urged against seat 236' thereby sealing the vacuum in the front chamber 318. One more full power brake application is now available and reduced power assists are available until the vacuum is the servomotor has been reduced to atmospheric pressure by dumping. Thus, power assists are provided to the braking system when the source of vacuum fails.

In the embodiment shown in FIG. 5, the relay valve and check valve have been combined in a single unit U. The single unit U consists of a housing 401 containing a valve spring 222' retained by a diaphragm backing plate 224', a diaphragm 226' dividing the housing into chamber 412 and 414, a front diaphragm plate 228' attached to valve-actuating rod 230' retained and sealed in bearing member 232' and a poppet seal 234' resting on seat 236' in wall 418, making up the relay valve portion of the unit, while poppet seal 112', retainer 114, spring 116' and retainer 118' sealed in port 405 connected to a source of vacuum make up the check valve portion of the unit. The servomotor B' is the same as that described in FIG. 1 expect that the tubular projection 38' does not provide communication between chambers 24 and 29 since the conduits 422 and 424 directly connect these chambers with the source of vacuum. Moreover, the flexible connection 31 has been eliminated by providing passageway 34' through hub 36' to supply the rear chambers 32' and 46' with vacuum to suspend the diaphragm 40' and 48' when the actuating pedal 21' (not shown in FIG. 5) is at rest and the engine is producing high vacuum.

Similarly, as described in the operation of check valve D of the embodiment of FIG. 1, the poppet 112' will move from seat 120' when vacuum from the manifold G' (not shown in FIG. 5) overcomes spring 116'. With poppet 112' unseated, vacuum is available in bore 426 of the unit U. The available vacuum in bore 426 is transmitted to chamber 412 by passage 428 where if the pressure differential across diaphragm 226, caused by having vacuum in chamber 412 and chamber 414 ported to the atmosphere, is great enough to overcome spring 222', the seal 234' will move from seat 236'. With seal 234' unseated from 236', the air in chambers 24 and 29 will be evacuated to vacuum suspending the diaphragm member 40' and 48'.

Similarly, as described in FIG. 1, when the vacuum in the servomotor is below a predetermined value, the seal 234' will seal the vacuum in chamber 24 permitting one application of the brakes with full power and reduced assist thereafter until the vacuum in the servomotor has been reduced to atmospheric pressure.

In the above-described embodiments of my invention, I have assured the operator of a vehicle some power assist if the engine is not running. While the invention has been described in considerable detail, I do not wish to be limited to the particular embodiments shown and described; and it is my intention to cover hereby all novel adaptations, modifications and arrangements thereof which come within the practice of those skilled in the art to which the invention relates.

I claim:

1. A fluid pressure motor in a power brake system comprising:

a housing having movable wall means dividing the interior thereof into a front chamber and a rear chamber;

a power piston located in the front chamber connecting said wall means with a hydraulic cylinder;

a source of vacuum;

check valve means connected to said source of vacuum;

vacuum control means connected to said check valve means through an inlet port, to said front chamber through a first outlet port and to said rear chamber through a second outlet port, said check valve means permitting said source of vacuum to evacuate air from said front and rear chambers through said first and second outlet ports during periods of high vacuum but preventing the back flow of air during periods of low vacuum availability at said source:

actuating means operatively connected to said housing;

control valve means operatively connected to said rear chamber responsive to movement of said actuating means to regulate the communication of said vacuum and air at atmospheric pressure to said rear chamber to develop an operational pressure differential across said movable means;

diaphragm means within said vacuum control means movable in response to a sensed pressure differential creased by the vacuum supplied to said front and rear chambers through the check valve means and air at atmospheric pressure; and plunger means connected to said diaphragm means for seating on said first outlet port and sealing said front chamber when a predetermined pressure differential condition is sensed by said diaphragm means and thereby maintaining a uniform operational pressure differential across said movable wall means upon movement of said control means by said actuating means.

2. A control for a power brake system having a fluid-operated servomotor responsive to the movement of a brake pedal, said system comprising:

actuator means operated by said brake pedal;

a servomotor housing divided into front and rear variable volume chambers by a wall member, said wall member having a power piston located in said front variable volume chamber;

fluid pressure intensifying means moved by the power piston in said servomotor housing;

a source of partial vacuum;

control means having an internal chamber with an inlet port, a first outlet port and a second outlet port, said first outlet port being connected to said front variable volume chamber and said second outlet port being connected to said rear variable volume chamber;

check valve means located in a conduit connecting said source of partial vacuum with said inlet port, said check valve means permitting said partial vacuum to evacuate air at atmospheric pressure from said front and rear chambers through said first and second outlet ports, said check valve means preventing the backflow of air during periods of low partial vacuum levels at said source;

valve means responsive to said actuator means for regulating communication of partial vacuum and air at atmospheric pressure to the rear variable volume chamber to create an operational pressure differential across said wall member causing said power piston to move said fluid pressure intensifying means;

pressure sensing means located in said control means for comparing the level of partial vacuum in the front and rear variable volume chambers with air at atmospheric pressure; and plunger means responding to said pressure sensing means for sealing the front variable volume chamber when said compared partial vacuum level is at a predetermined level to assure a uniform operational pressure differential across said wall means when air at atmospheric pressure is communicated to said rear chamber upon movement of said actuating means.

* * * * *